United States Patent Office.

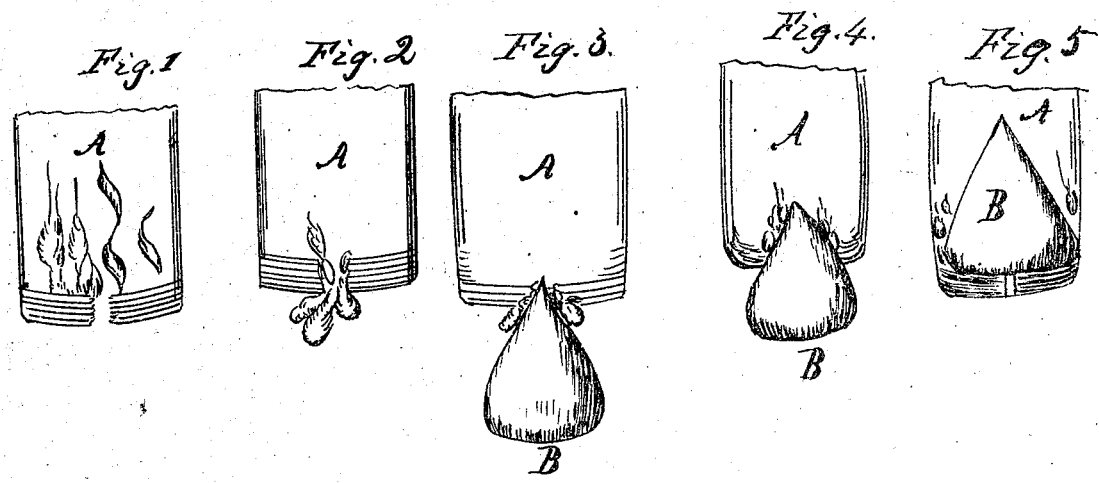

HENRY H. SEYS, OF OIL CITY, PENNSYLVANIA.

Letters Patent No. 75,586, dated March 17, 1868.

SURGICAL SUPPOSITORY.

The Schedule referred to in these Letters Patent and making part of the same.

TO ALL WHOM IT MAY CONCERN:

Be it known that I, HENRY H. SEYS, of Oil City, in the county of Venango, and State of Pennsylvania, have invented a new and useful Improvement in Suppositories; and I do hereby declare that the following is a full, clear, and exact description thereof, which will enable others skilled in the art to make and use the same, reference being had to the accompanying drawings forming part of this specification.

This invention relates to a new and improved method of treating certain diseases, and the invention consists in the composition of a suppository which, when introduced into the rectum, shall act mechanically in re-turning hemorrhoidal tumors and prolapsed portions of the anus, and retaining the extruding parts in place by pressure upon the blood-vessels, thereby preventing the tumors from filling, and also, by pressure, tend to their final abruption and cure; and, also, by such application, to bring in contact with the diseased tissues the astringent and healing substances of which the suppository is composed.

I am aware that there is nothing new in the use of suppositories for the treatment of hemorrhoidal diseases as a vehicle for medicinal substances; nor is there any novelty in the use of the substances of which mine is composed; and, as is well known, pessaries are not novel. But suppositories so made as to act as a pessary, and at the same time as a vehicle for medicinal application, are believed to be new.

The formula of my suppositories for the treatment of hemorrhoids, *prolapsus ani*, and varicose hemorrhoidal veins, is as follows: Pulverized flax-seed or elm-bark, tallow, or tallow and wax, or cocoa-butter, or other suitable material, of sufficient quantity, alone or combined with sulphate of iron or tannin, or other suitable astringent. The extracts of stramonium, or opium, or morphine, or other suitable anodyne, may be used according to circumstances. The whole commingled by means of heat, and moulded into a conoidal-shaped mass of suitable size for the treatment of different cases. Neither the sizes nor the quantities of the different ingredients used can be determined with any degree of certainty, as different circumstances and conditions would render variations necessary.

In regard to the size of the suppository, it should be sufficient to fill the lower portion of the rectum, and so press upon the tumors and dilated varicose vessels as to prevent their filling with blood, and, resting upon the superior surface of the sphincter-muscle, act as a valve to prevent the tumors from prolapsing. The suppository, after remaining in the intestine a certain length of time, slowly dissolves or melts, and thus applies to the diseased tissues the medicinal ingredients contained in it; the anodyne allaying the pain, and the astringents producing the desired contraction of parts.

For the purpose of showing the method of forming and applying the suppository, and some of the different forms of disease to which it is applicable, the drawings and Figures 1, 2, 3, 4, and 5, are herewith submitted.

A represents the rectum, and B the suppository.

Having thus described my invention, what I claim as new, and desire to secure by Letters Patent, is—

A suppository, which, while it acts in the rectum as a pessary and valve upon the blood-vessels, shall impart the medicinal properties of which it is composed to the diseased vessels, substantially as described.

A suppository, composed of linseed-meal or pulverized oil-cake, or the two combined in proper proportions, or other similar oleaginous or mucilaginous vegetable material alone, or mixed with suitable anodyne and astringent medicines, formed into a conoidal-shaped mass, so that when introduced into the rectum it shall produce the effects as herein shown and described.

HENRY H. SEYS.

Witnesses:
R. COLBERT,
J. B. REYNOLDS.